(12) United States Patent
Kwon et al.

(10) Patent No.: US 11,157,231 B2
(45) Date of Patent: Oct. 26, 2021

(54) METHOD AND APPARATUS FOR CONTROLLING SOUND SIGNAL OUTPUT

(71) Applicant: Samsung Electronics Co., Ltd., Gyeonggi-do (KR)

(72) Inventors: Hyungjin Kwon, Gyeonggi-do (KR); Kwanhee Han, Gyeonggi-do (KR); Sungmin Kim, Gyeongsangbuk-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/896,417

(22) Filed: Jun. 9, 2020

(65) Prior Publication Data

US 2020/0310741 A1    Oct. 1, 2020

Related U.S. Application Data

(63) Continuation of application No. 15/207,597, filed on Jul. 12, 2016, now Pat. No. 10,684,814, which is a (Continued)

(30) Foreign Application Priority Data

Jul. 30, 2012    (KR) .................. 10-2012-0083437

(51) Int. Cl.
*G06F 3/16* (2006.01)
*G06F 3/0482* (2013.01)
(Continued)

(52) U.S. Cl.
CPC ............ *G06F 3/162* (2013.01); *G06F 3/0482* (2013.01); *G06F 3/165* (2013.01); *H04R 1/1041* (2013.01); *H04R 3/04* (2013.01); *H04S 7/308* (2013.01)

(58) Field of Classification Search
CPC ........ G06F 3/162; G06F 3/0482; G06F 3/165; H04R 1/1041; H04R 3/04; H04S 7/308
See application file for complete search history.

(56) References Cited

U.S. PATENT DOCUMENTS

| 8,385,824 B2 | 2/2013 | Bakshi et al. |
| 2006/0007015 A1 | 1/2006 | Krzyzanowski et al. |

(Continued)

FOREIGN PATENT DOCUMENTS

| KR | 10-0342700 B1 | 10/2002 |
| KR | 10-2005-0046452 A | 5/2005 |

(Continued)

OTHER PUBLICATIONS

The Project for Maximizing the Capabilities of Earphones (Headphones) (@iOS), http://goldenears.net/board/index.php?mid=ST_KB_byGE&search_target=tag&search_keyword=%EC%9D%B4%EC%96%B4%ED%8F%.

*Primary Examiner* — David L Ton
(74) *Attorney, Agent, or Firm* — Cha & Reiter, LLC (57) ABSTRACT

A method and an apparatus control sound signal output. The method of controlling a sound signal output in a terminal includes: storing receiver identifications and corresponding sound signal control parameters associated with each other by the terminal; providing a receiver selection interface capable of selecting one from a list of the receiver identifications and the receiver identifications included in the list by the terminal; receiving one receiver identification through the receiver selection interface; converting a digital sound signal into an analog sound signal by applying a sound signal control parameter corresponding to the received receiver identification; and outputting the analog sound signal.

23 Claims, 9 Drawing Sheets

Related U.S. Application Data continuation of application No. 13/947,346, filed on Jul. 22, 2013, now abandoned.

(51) Int. Cl.
  *H04S 7/00* (2006.01)
  *H04R 1/10* (2006.01)
  *H04R 3/04* (2006.01)

(56) References Cited

U.S. PATENT DOCUMENTS

| | | |
|---|---|---|
| 2006/0205349 A1 | 9/2006 | Passier et al. |
| 2006/0274901 A1 | 12/2006 | Terai et al. |
| 2008/0318629 A1 | 12/2008 | Inha et al. |
| 2011/0002471 A1 | 1/2011 | Wihardja et al. |

FOREIGN PATENT DOCUMENTS

| | | |
|---|---|---|
| KR | 10-2008-0063309 A | 7/2008 |
| KR | 10-2008-0066143 A | 7/2008 |
| KR | 10-2010-0062057 A | 6/2010 |

METHOD AND APPARATUS FOR CONTROLLING SOUND SIGNAL OUTPUT

CROSS REFERENCE TO RELATED APPLICATIONS

This application is a Continuation of U.S. patent application Ser. No. 15/207,597 filed on Jul. 12, 2016 which is a Continuation of U.S. patent application Ser. No. 13/947,346 filed on Jul. 22, 2013 which claims, pursuant to 35 U.S.C. § 119(a), priority to and the benefit of the earlier filing date of a Korean patent application filed on Jul. 30, 2012 in the Korean Intellectual Property Office and assigned Serial No. 10-2012-0083437, the entire disclosure of which is hereby incorporated by reference.

BACKGROUND

1. Field

The present disclosure relates to a method and an apparatus for controlling sound signal output, and more particularly, to a method of suitable sound output by a receiver connected to a terminal and an apparatus thereof.

2. Description of the Related Art

Various devices in the prior art may output music or other sounds. In the past, a user would listen to music or other sound information through a Compact Disc (CD) player or a cassette tape player and through a personal computer, a portable phone, or an MP3 player in the prior art. In particular, a portable phone of the prior art has evolved to become a smart phone. Accordingly, the user may conveniently download the music and other sound information in the smart phone through the Internet or other devices. Further, the user may listen to the music downloaded in the smart phone through a receiver such as an earphone or a head phone. The user may receive sound data through the smart phone using a streaming service method.

In particular, a portable terminal such as the smart phone is frequently used in outside environments rather than in indoor environments, or at a public place such as a subway or a bus. In this case, it is not preferable to listen to the music using a speaker embedded in the smart phone. First, a user listens to the music using a speaker in public facilities such as the subway would adversely affect other nearby passengers or citizens. When a speaker is used in the outside environment, it is also difficult to listen to the music due to external noise. Accordingly, most portable terminals include a connector inserting unit (plug) capable of connecting a connector (jack) such as an earphone or a head-phone. The earphone/head-phone receives a sound signal output from the plug. In the prior art, a device receiving a sound signal output from the earphone/head-phone or other plugs and providing the received sound signal to a user is referred to as a receiver.

Various companies have manufactured various receiver models. Output characteristics of each receiver model are different from each other. For example, some models output a relatively large sound but other models output a relatively small sound with respect to the same sound signal. Some models increase a sound of a low sound band but reduce a sound of a high sound band with respect to the same sound signal, whereas other models increase a sound of the high sound band but reduce a sound of the low sound band with respect to the same sound signal. In order to provide a sound similar to an original sound or a sound suitable for listening by the user, there is a need to adjust a suitable sound signal according to each receiver model. However, according to the prior art, when the portable terminal is manufactured, a sound signal optimized to a bundle receiver of the portable terminal; that is, a receiver bundled or sold with the portable terminal, is set to be output. However, an actual user frequently uses an earphone or a head-phone purchased by the user instead of the bundle receiver. In this case, an optimal sound may not be provided to the user.

SUMMARY

The present invention has been made in view of the above problems, and provides a method of controlling a sound signal output which allows a user to receive an optimal sound by providing a suitable sound signal according to a receiver, and an apparatus thereof.

In accordance with an aspect of the present invention, a method of controlling a sound signal output in a terminal includes: storing receiver identifications and corresponding sound signal control parameters associated with each other by the terminal; providing a receiver selection interface capable of selecting one from a list of the receiver identifications and the receiver identifications included in the list by the terminal; receiving one receiver identification through the receiver selection interface; converting a digital sound signal into an analog sound signal by applying a sound signal control parameter corresponding to the received receiver identification; and outputting the analog sound signal.

In accordance with another aspect of the present invention, an apparatus for controlling a sound signal output includes: a memory storing receiver identifications and corresponding sound signal control parameters associated with each other; a display unit displaying a list of the receiver identifications; a controller providing a receiver selection interface capable of selecting one from the receiver identifications included in the list; an input unit receiving one receiver identification through the receiver selection interface; and an audio processor converting a digital sound signal into an analog sound signal by applying a sound signal control parameter corresponding to the received receiver identification and outputting the analog sound signal.

BRIEF DESCRIPTION OF THE DRAWINGS

The above features and advantages of the present invention will be more apparent from the following detailed description in conjunction with the accompanying drawings, in which.

DETAILED DESCRIPTION

Here, a method and an apparatus for controlling a sound signal output according to exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

The present invention may, however, be embodied in many different forms and should not be construed as limited to the exemplary embodiments set forth herein. In addition, terms described herein, which are defined with reference to the functions of the present invention, may be implemented differently depending on a user or operator's intention and practice. Therefore, the terms should be understood on the basis of the disclosure throughout the specification. The principles and features of this invention may be employed in varied and numerous exemplary embodiments without departing from the scope of the invention.

Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, an icon refers to a graphical element such as a figure or a symbol displayed on the screen of the device such that a user can easily select a desired function or data. In particular, each icon has a mapping relation with any function being executable in the device or with any data stored in the device and is used for processing functions or selecting data in the device. When a user selects one of the displayed icons, the device identifies a particular function or data associated with the selected icon. Then the device executes the identified function or displays the identified data.

Among the terms set forth herein, data refers to any kind of information processed by the device, including text and/or images received from any external entities, messages transmitted or received, and information created when a specific function is executed by the device.

Figure 1:
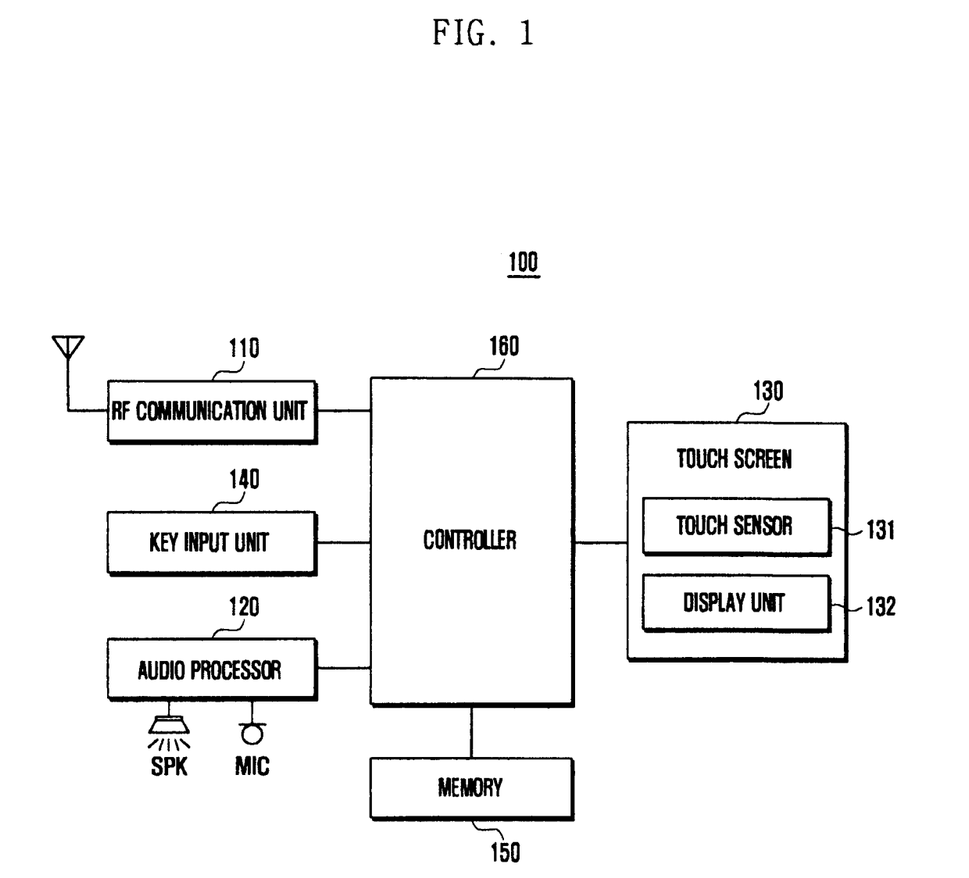
FIG. 1 is a block diagram illustrating a configuration of an apparatus for controlling a sound signal output according to an exemplary embodiment of the present invention.

FIG. 1 is a block diagram illustrating a configuration of an apparatus 100 for controlling a sound signal output according to an exemplary embodiment of the present invention.

The apparatus 100 for controlling a sound signal output according to the exemplary embodiment of the present invention includes a radio frequency (RF) communication unit 110, an audio processor 120, a touch screen 130, a key input unit 140, a memory 150, and a controller 160. The apparatus 100 for controlling a sound signal output may be implemented in the form of a terminal, for example, a portable terminal such as a smart phone, a navigation device, or a PDA.

The RF communication unit 110 performs a transceiving function of corresponding data for wireless communication of the apparatus 100 for controlling a sound signal output. The RF communication unit 110 may include at least one of an RF transmitter for up-converting a frequency of a transmitted signal and amplifying the converted signal, an RF receiver for low-noise-amplifying a received signal and down-converting the amplified signal, and similar communication modules. The RF communication unit 110 receives and outputs data through a wireless channel to the controller 160 and transmits data outputted from the controller 160. The RF communication unit 110 may be omitted in a case of an apparatus for controlling a sound signal output which does not require a wireless communication function. In particular, according to the exemplary embodiment of the present invention, the RF communication unit 110 may transmit a search word to an external device or request a sound signal control parameter from the external device, for example, using known communication methods and accessing various external devices such using any known network, including the Internet or other known sources of data, and receive and transfer a response to the controller 160 under control of the controller 160. Data transceived by the RF communication unit 110 will be described herein with reference to FIGS. 6 and 7.

The audio processor 120 converts a digital audio (sound) signal into an analog audio signal through an audio CODEC and plays the analog audio signal through a receiver, such as the speaker SPK shown in FIG. 1, which may be any known audio speaker and/or a connector, jack, or plug to an external audio device, as described herein. As used herein, the term "receiver" refers to a speaker such as the speaker SPK or an audio device, as well as a connector, jack, or plug to an external audio device. The audio processor 120 converts an analog audio signal input from a microphone MIC into a digital audio signal through an audio CODEC. The audio processor 120 may include a CODEC. The CODEC may include a data CODEC processing packet data and an audio CODEC processing an audio signal such as a voice. In particular, the audio processor 120 according to the exemplary embodiment of the present invention selects a sound signal control parameter according to a user setting. The audio processor 120 converts a digital audio signal into an analog audio signal using the selected sound signal control parameter, and transfers the converted analog audio signal to the receiver or speaker SPK. A connector (jack) of the receiver is connected to a connector insertion unit (plug) of the terminal implementing the apparatus 100. The receiver refers to a sound output device which may be connected to a connector insertion unit of an earphone, a head-phone, or other connectors or plugs. The receiver receives an analog audio signal through the connector and the connector insertion unit and converts the analog audio signal into a real sound. The connector insertion unit transfers an analog audio signal from the audio processor 120 to the receiver. For example, the connector insertion unit may include various connectors or plugs, such as a 3.5 mm earphone plug, a 2.5 mm earphone plug, a 20 pin plug, and a 24 pin plug. Since a shape of the connector insertion unit is not important in the present invention, a detailed description thereof is omitted.

The touch screen 130 includes a touch sensor 131 and a display unit 132. The touch sensor 131 detects a touch input of the user. The touch sensor 131 may be configured by a touch detection sensor such as a capacitive overlay sensor, a resistive overlay sensor, an infrared beam sensor, or a pressure sensor. Various types of sensor devices capable of detecting contact or pressure of an object may be configured as the touch sensor 131 of the present invention in addition to the foregoing sensors. The touch sensor 131 detects a touch input of the user and generates and transmits a detection signal to the controller 160. The detection signal includes coordinates data which represents where on the touch screen 130 the user inputs the touch.

The display unit 132 visually provides and displays a menu of the apparatus 100 for controlling a sound signal output, input data, function setting information and other various information to the user. The display unit 132 may be configured by a Liquid Crystal Display (LCD), an Organic Light Emitting Diode (OLED), and an Active Matrix Organic Light Emitting Diode (AMOLED). The display unit 132 performs a function of outputting a booting screen, an idle screen, a menu screen, a call screen, and other application screens of the apparatus 100 for controlling a sound signal output. Further, the display unit 132 enlarges and displays a picture, screen, or interface under the control of the controller 160.

Although the apparatus 100 for controlling a sound signal output includes the touch sensor 131 as illustrated above, the exemplary embodiment of the present invention is not limited to an apparatus 100 for controlling a sound signal output including the touch sensor 131. When the present invention is applied to an alternative embodiment of the apparatus 100 for controlling a sound signal output but having no touch sensor 131, the touch screen 130 may be transformed or implemented and applied to perform only a function of the display unit 132.

The key input unit 140 receives a key operation of the user for controlling the apparatus 100 for controlling a sound signal output and generates and transfers an input signal to the controller 160. The key input unit 140 may be configured by a key pad including a character key, a symbol key, a numeric key, and/or an arrow key, and may be configured by a predetermined function key provided at one side of the apparatus 100 for controlling the sound signal output. In a case of the apparatus 100 for controlling the sound signal output being capable of performing all operations by only a touch screen 130, the key input unit 140 may be omitted.

Both of the key input unit 140 and the touch sensor 131 receive an input of a user and transfer the input of the user to the controller 160. For this reason, the key input unit 140 and the touch sensor 131 may be generally called an input unit, and so the term "input unit" refers herein to either or both of the key input unit 140 and the touch sensor 131.

Figure 3:
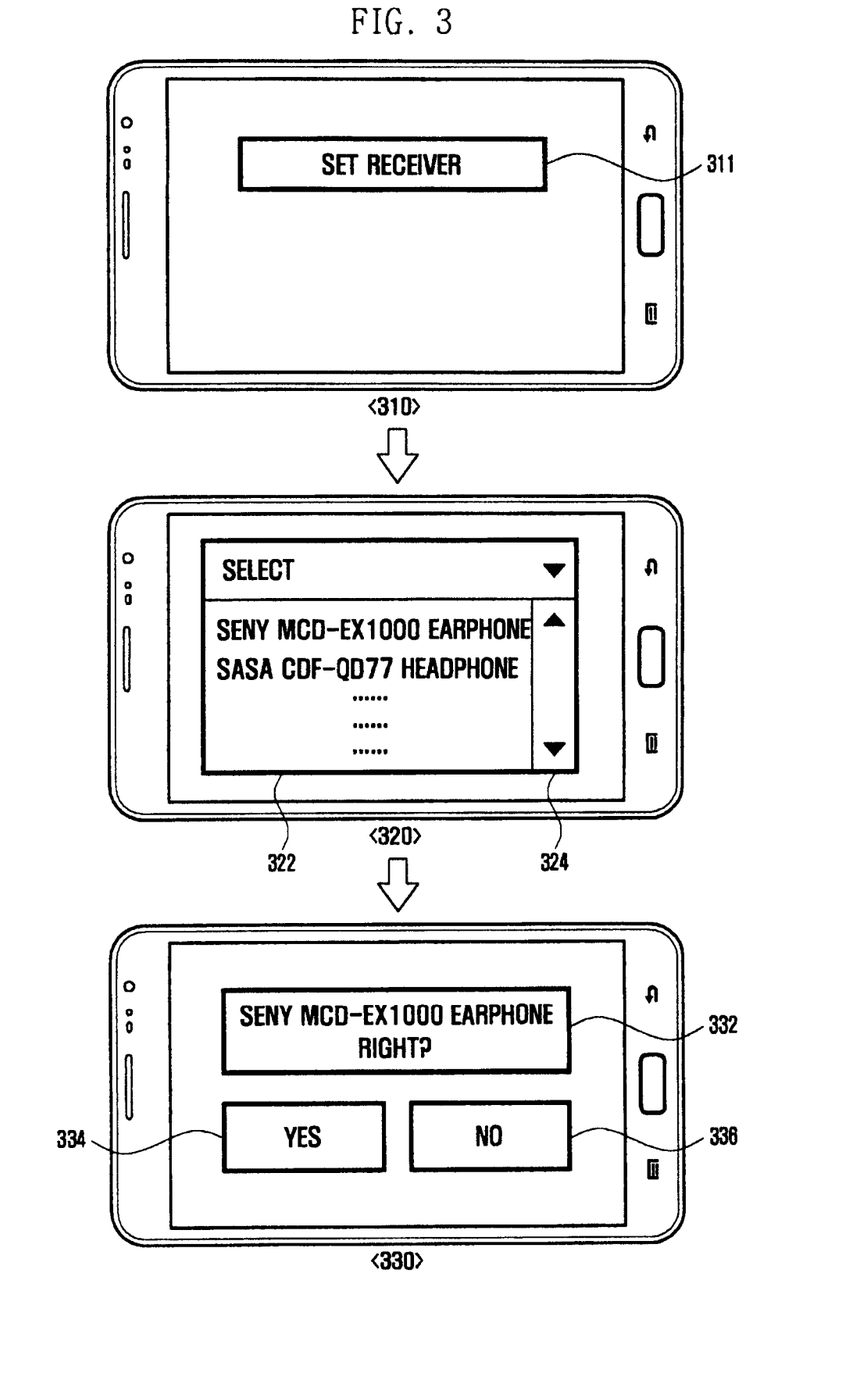
FIG. 3 is a diagram illustrating a user interface for setting a sound signal control parameter according to a first exemplary embodiment of the present invention.
Figure 4:
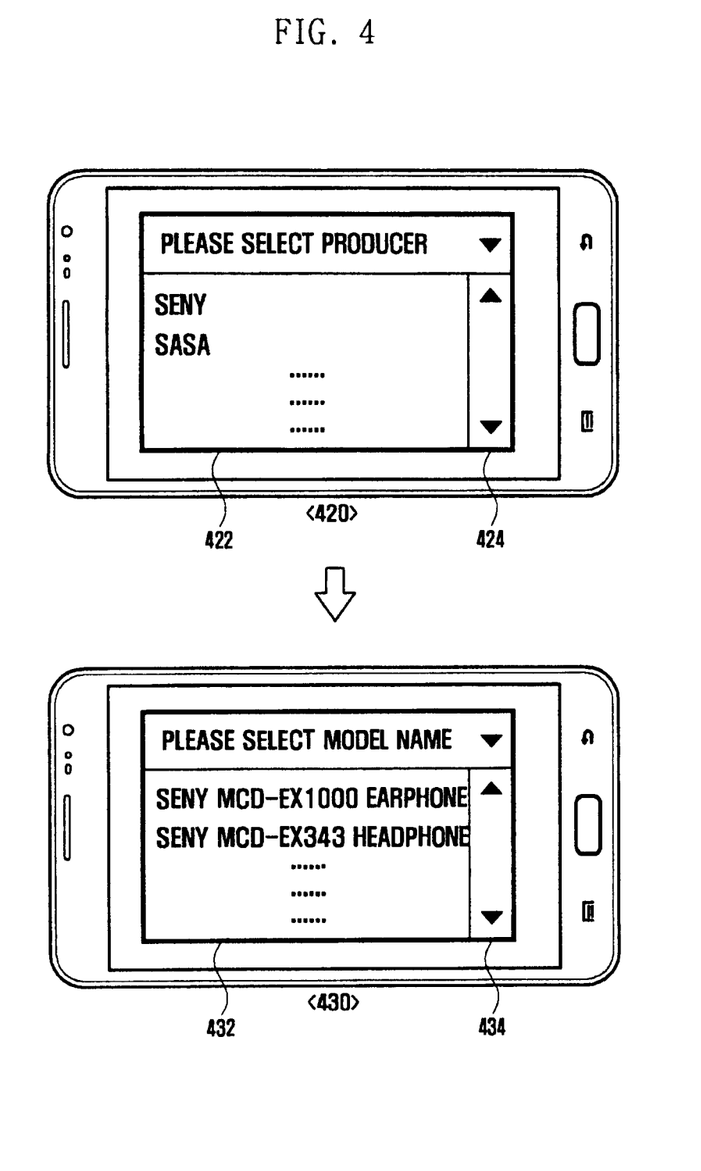
FIG. 4 is a diagram illustrating a user interface for setting a sound signal control parameter according to a second exemplary embodiment of the present invention.
Figure 5:
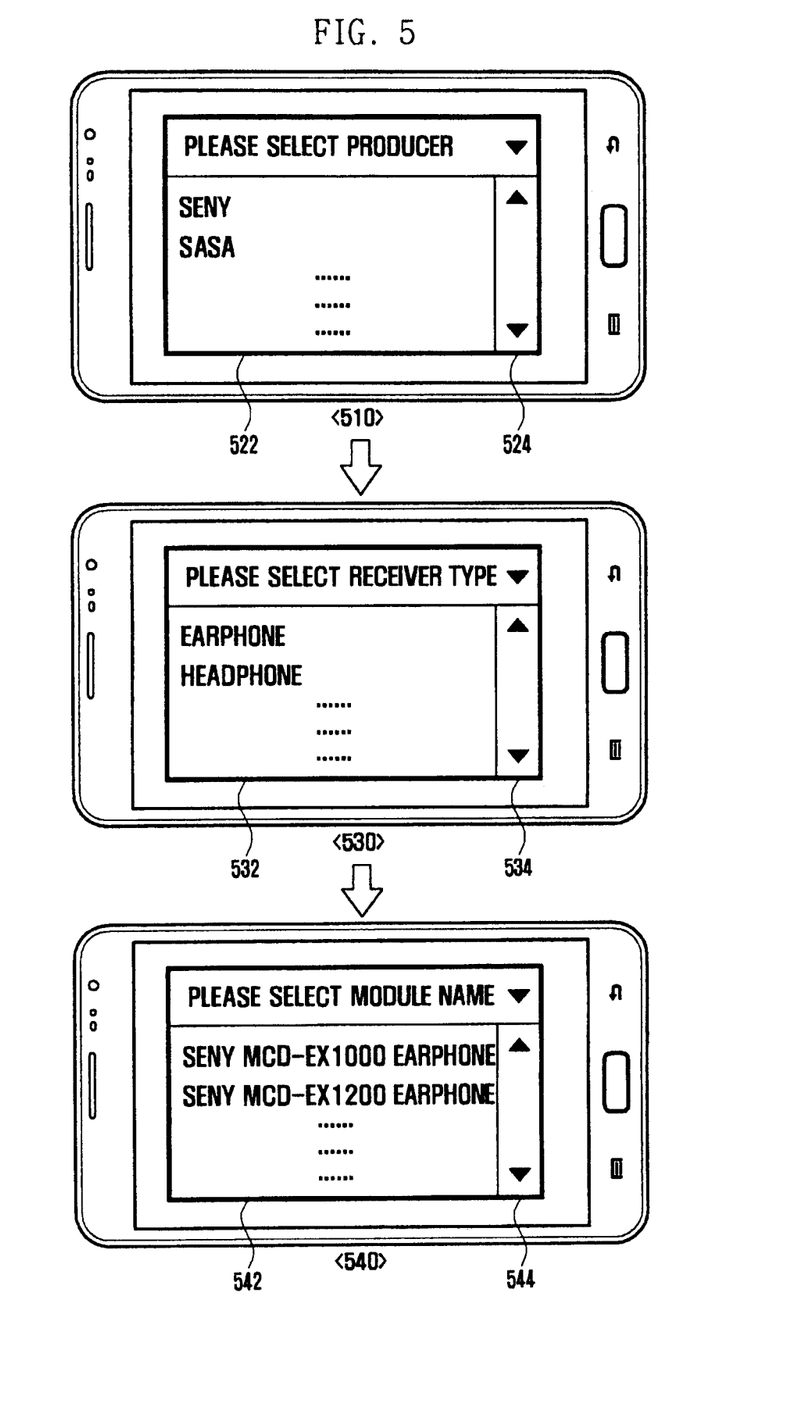
FIG. 5 is a diagram illustrating a user interface for setting a sound signal control parameter according to a third exemplary embodiment of the present invention.

The input unit and the display unit 132 may provide a user interface as shown in FIGS. 3 to 5 under control of the controller 160. A detailed configuration of the user interface will be described with reference to FIGS. 3 to 5.

The memory 150 stores programs and data necessary for an operation of the apparatus 100 for controlling a sound signal output. The memory 150 may be divided into a program area and a data area. The program area may store a program controlling an overall operation of the apparatus 100 for controlling a sound signal output, an operating system for booting the apparatus 100 for controlling a sound signal output, an application program necessary for playing multi-media contents, and an application program necessary for other optional functions of the apparatus 100 in addition to controlling a sound signal output, for example, a camera function, a sound playback function, and an image or moving image playback function. The data area may store data generated according to use of the apparatus 100 for controlling a sound signal output, images, moving pictures, phone-books, and audio data.

In particular, the memory 150 according to the exemplary embodiment of the present invention may store receiver identifications and corresponding sound signal control parameters associated with each other. According to a modified example, the memory 150 may further store receiver identifications, corresponding producer names, and receiver types. The data stored in the memory 150 will be described herein with reference to FIGS. 3 to 5.

The controller 160 controls an overall operation with respect to the constituent elements of the apparatus 100 for controlling a sound signal output. In particular, the controller 160 may provide an interface as illustrated in FIGS. 3 to 5. Further, the controller 160 may select a suitable parameter according to an input of a user through any of the methods of FIG. 2, FIG. 6, or FIG. 7, and accordingly controls the audio processor 120 to convert a digital sound signal into an analog sound signal. A detailed operation of the controller 160 will be described with reference to FIGS. 2 to 7.

Figure 2:
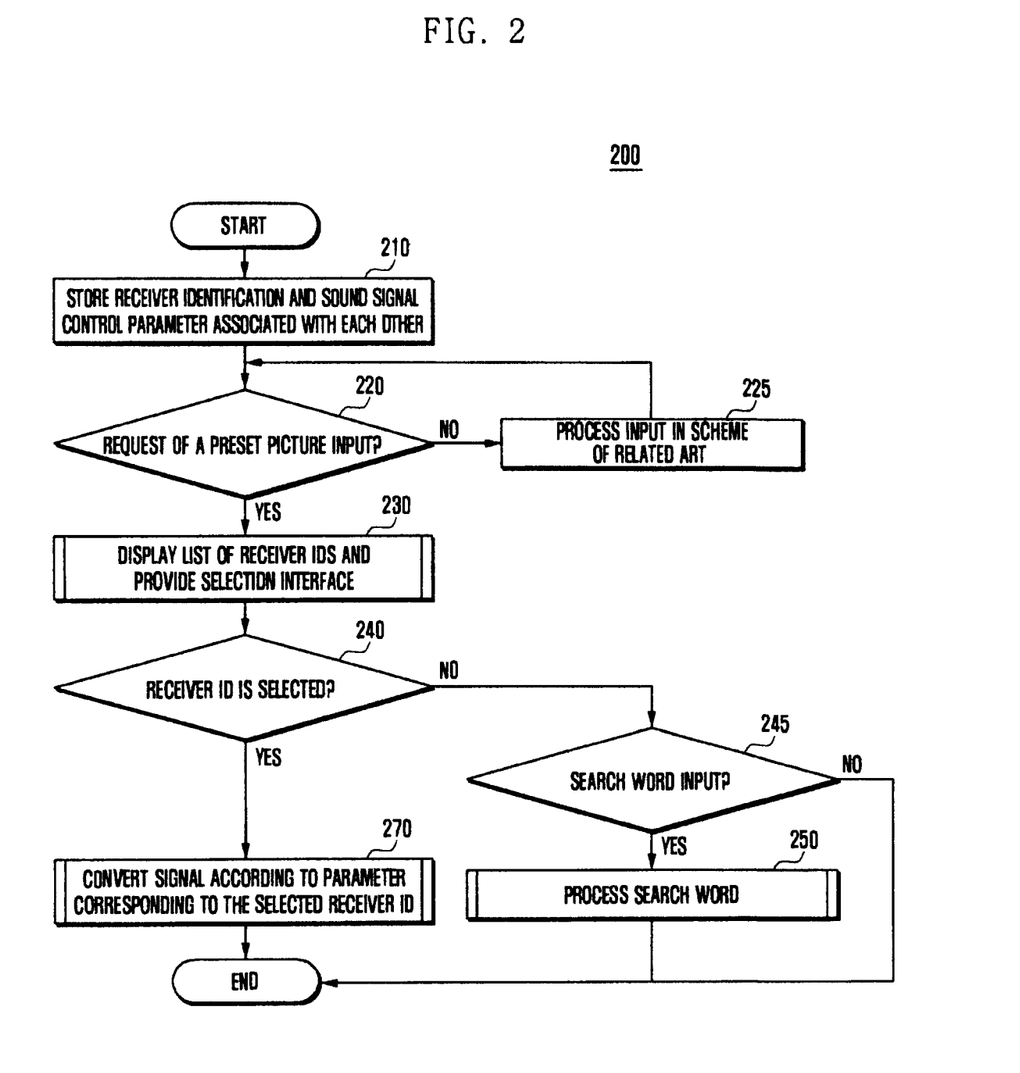
FIG. 2 is a flowchart illustrating a method of controlling a sound signal output according to the exemplary embodiment of the present invention.

FIG. 2 is a flowchart illustrating a method 200 of controlling a sound signal output according to the exemplary embodiment of the present invention.

A memory 150 stores receiver identifications and corresponding sound signal control parameters associated with each other in step 210. For example, a terminal producer or manufacturer of the apparatus 100 implemented, for example, in the form of a portable terminal, may pre-store corresponding data in the memory 150 during the time of manufacture of the apparatus 100, and provide the corresponding data to a consumer or user. According to an alternative exemplary embodiment, a software provider or user may operate the apparatus 100 for controlling a sound signal output to store receiver identifications and corresponding sound signal control parameters associated with each other in the memory 150. The user may store the receiver identifications and corresponding sound signal control parameters associated with each other by downloading and installing an application or updating the application. According to a modified example, the memory 150 may further store the receiver identifications (ID) and corresponding producer names and/or receiver type information.

Table 1 provides examples of information stored by the memory 150 according to the exemplary embodiment of the present invention.

TABLE 1

| Receiver ID | Parameter | Receiver type | Produce name |
| --- | --- | --- | --- |
| SENY MCD . . . | A | Earphone | SENY |
| SASA FDR . . . | B | Head-phone | SASA |
| YETTIE GPD . . . | C | Earphone | YETTIE |

In Table 1, the receiver ID and the sound signal control parameter are essential, but the receiver type and the producer name information may be optionally included or excluded, or may be unnecessary according to the exemplary embodiment of the present invention.

The receiver ID is not always a unique value, but the receiver ID is sufficient if the receiver ID includes information indicating which receiver represents a combination of a model name and other information substantially obtained or used by the user. For example, when the receiver IDs have the same two records, if the receivers has different producer names or receiver types, different producer names or receiver types are provided to the user so that the user distinguishes the receivers. The receiver ID may also include a model name of a corresponding receiver, but the present invention is not limited thereto. According to the exemplary embodiment, the receiver ID may include a nickname or an alias other than a normal model name.

Referring again to FIG. 2, the controller 160 determines whether a request of a preset picture, image, or display screen of the display unit 132 is input in step 220. The request of the preset picture may include a request for a preset picture or screen of an operating system or an application of the apparatus for controlling a sound signal output, and other suitable or known menus and methods, such as user interfaces. As used herein the term "picture" refers to an image such as a screen image and/or a user interface output or displayed by the display unit 132.

FIG. 3 is a diagram illustrating a user interface for setting a sound signal control parameter according to a first exemplary embodiment of the present invention.

A receiver setting button 311 is displayed on a first picture 310. The user may select the receiver setting button 311 to receive a detailed interface for setting the sound signal control parameter.

According to the modified example, when it is detected that a connector, jack, or other members such as a speaker plug is inserted into a connector insertion unit instead of an explicit button being pressed, the display unit 132 may provide or display an interface as illustrated in a second picture 320. According to another modified example, when an application requiring a sound output is executed or an application executes a function requiring the sound output, an application as illustrated in the second picture 320 of FIG. 3 may be provided.

Referring back to FIG. 2, when a request of the preset picture is input through an input unit at step 220, the process goes to step 230. However, in step 220 when the request of the preset picture is not input through the input unit, the input is processed in a scheme or method of the related art or of the prior art in step 225, and the method loops back to step 220.

The controller 160 displays a list of receiver IDs through the display unit 132 and provides an interface capable of selecting one receiver ID from the list through the display unit 132 and the input unit in step 230.

Referring back to FIG. 3, a list 322 of receiver IDs is displayed on the second picture 320. When all receiver IDs are not or cannot be displayed on one picture, a scroll bar 324 may be provided to scroll down or up to view more available receiver IDs. The user may select one specific receiver ID from the displayed receiver IDs included in the list 322 of receiver IDs. According to a modified example, the list 322 of receiver IDs may display a type and a producer name of a receiver as well as the receiver ID. Hereinafter, the same modification is applicable to the exemplary embodiment of FIGS. 4 and 5.

The third picture or interface 330 is displayed in FIG. 3. When the user selects, for example. "SENY MCD-EX1000 EARPHONE" from the list 322 in the second picture 320, the controller 160 may provide a message 332 to the user to confirm the selection. The user may select one choice from buttons 334 and 336 to determine or confirm the selection using the accept or YES button 334, or to cancel the selection using the cancel or NO button 336. According to the exemplary embodiment, a procedure for displaying the third picture 330 may be omitted.

FIG. 4 is a diagram illustrating a user interface for setting a sound signal control parameter according to a second exemplary embodiment of the present invention.

According to the second exemplary embodiment, when the receiver setting button 311 is selected from the first picture 310 in FIG. 3, the controller 160 controls the display unit 132 to display a first picture 420 of FIG. 4. A list 422 of producer names is provided by the first picture 420 of FIG. 4, and the list 422 may be scrolled through using the scroll bar or buttons 424. The list 422 of producer names may include the whole producer names stored in data of Table 1. In one example, the user selects one producer name, for example, "SENY" from the list 422. In this case, the controller 160 controls the display unit 132 to display a second picture 430 of FIG. 4. A list 432 of all receiver IDs corresponding a producer "SENY" is included in the second picture 430 of FIG. 4, and the list 432 may be scrolled through using the scroll bar or buttons 434. The user may select one receiver ID from the list 432. In the same manner as a case of FIG. 3, for convenience of the user, scroll bars 424 and 434 may be provided in the pictures 420, 430, respectively. The list 322 of receiver IDs may be excessively long in the case of FIG. 3 so that it may be difficult to select a receiver ID. Accordingly, as in a case of FIG. 4, the selection may be easily achieved by reducing the number of receiver IDs displayed from selection of a producer name.

FIG. 5 is a diagram illustrating a user interface for setting a sound signal control parameter according to a third exemplary embodiment of the present invention.

In the same manner as in the first picture 420 of FIG. 4, a list 522 of producer names is provided to the first picture 510 of FIG. 5, and the list 522 may be scrolled through using the scroll bar or buttons 524. If the user selects one receiver ID from the list 522, the controller 160 controls the display unit 132 to display a receiver type selection interface using the second picture 530 of FIG. 5. The second picture 530 of FIG. 5 includes a list 532 of receiver types, and the list 532 may be scrolled through using the scroll bar or buttons 534. For example, the list 532 of receiver types may include at least one of an earphone, a head-phone, and a (external) speaker. If a producer selected from the first picture 510 of FIG. 5 corresponds to a specific type of receiver, only a type corresponding to the producer may be displayed.

If one type of producer is selected from the second picture 530 of FIG. 5, the controller 160 may provide a third picture 540 of FIG. 5. A list 542 of receiver IDs suitable for a producer name and a receiver type selected from the first picture 510 and the second picture 530 is displayed on the third picture 540 of FIG. 5, and the list 542 may be scrolled through using the scroll bar or buttons 544. That is, a producer "SENY" and an "earphone" type are selected from the first picture 510 and the second picture 530 of FIG. 5, respectively, and a list 542 of an ID of a receiver corresponding to an earphone among receivers produced by SENY may be displayed. According to a modified example, a producer name may be skipped and only the receiver type may be selected. According to another modified example, the user may first select a receiver type and then select a producer name. According to still another modified example, the user may select a combination of the receiver type and the producer name at one time.

In the same manner as in the case of FIG. 3, in the exemplary embodiment of FIG. 5, scroll bars 524, 534, and 544 may be provided for convenience of a user for the lists 522, 532, 542 in pictures 510, 530, 540, respectively.

Referring back to FIG. 2, when step 230 is performed after the selection in FIGS. 3 to 5, the process goes to step 240.

The controller 160 determines whether a receiver ID is selected in step 240. The user may select a receiver ID in the exemplary embodiment of the pictures or interface of FIGS. 3 to 5, and may perform another input instead of selecting the receiver ID. When the receiver ID is selected, the process goes to step 270. The controller 160 loads a sound signal control parameter corresponding to the selected receiver ID from the memory 150, and controls the audio processor 120 to convert a digital sound signal into an analog sound signal using the sound signal control parameter in step 270, in a manner known in the art, such as by amplification or filtering, as described in connection with Table 2, and then the process of FIG. 2 ends. The sound signal control parameter may include a parameter indicating an intensity to which the sound signal is to be converted and/or a parameter indicating an intensity to which the sound signal with respect to a specific frequency band is to be converted.

Table 2 illustrates a sound signal control parameter according to the exemplary embodiment of the present invention.

TABLE 2

| Receiver ID | Total signal intensity | First band | ... | Eighth band |
|---|---|---|---|---|
| A | 10 dB | 30 dB | ... | 40 dB |
| B | −10 dB | −2 dB | ... | 60 dB |

Referring to the Table 2, in a case of a parameter corresponding to a receiver ID A, the whole sound signal is increased by 10 dB, a first band signal is increased by 30 dB in addition to the whole signal intensity of 10 dB, and an eighth band signal is increased by 40 dB in addition to the whole signal intensity of 10 dB. In a case of a parameter corresponding to a received ID B, the whole sound signal is reduced by 10 dB, and a first band signal is reduced by 2 dB in addition to the whole signal intensity of 10 dB. That is, the first band signal is reduced by 12 dB. Further, the eighth band signal is increased by 60 dB. When coupled with the whole signal intensity of −10 dB, the eighth band signal is increased by 50 dB.

A sound frequency is divided into, for example, eight bands, but alternatively the sound frequency may be divided into more bands or less bands. A frequency band may maintain a constant interval with a log scale or may use preset bands according to a predetermined or selected setting. Different frequency bands with respect to each parameter may be separately used.

According to a modified example, when a sound signal control parameter corresponding to the selected receiver ID is not stored in the memory 150, the controller 160 requests the sound signal control parameter from an external device to receive the sound signal control parameter, and the audio processor 120 may convert a sound signal by applying the parameter acquired from the external device. The modified example will be described herein with reference to FIG. 7.

Referring back to step 240, when the receiver ID is not selected at step 240, the process goes to step 245.

When the user does not find a receiver ID suitable for an interface as illustrated in FIGS. 3 to 5, the user may input a search word in a manner known in the art. The controller 160 may provide an interface, known in the art, for receiving a search word inputted by the user through the touch screen 130 and/or the key input unit 140 together with or separately from an interface of FIGS. 3 to 5. When the search word is input and detected in step 245, the process goes to step 250. When the search word is not detected as having been input in step 245, the process in FIG. 2 is terminated. According to another alternative exemplary embodiment, steps 245 and 250 may be omitted. In this case, a search word input interface is not provided.

Referring back to step 250, the apparatus 100 processes a received search word in step 250 to search for and match the search word with a receiver ID to select the matching receiver ID, or otherwise to not find a match. Then the process of FIG. 2 terminates.

Figure 6:
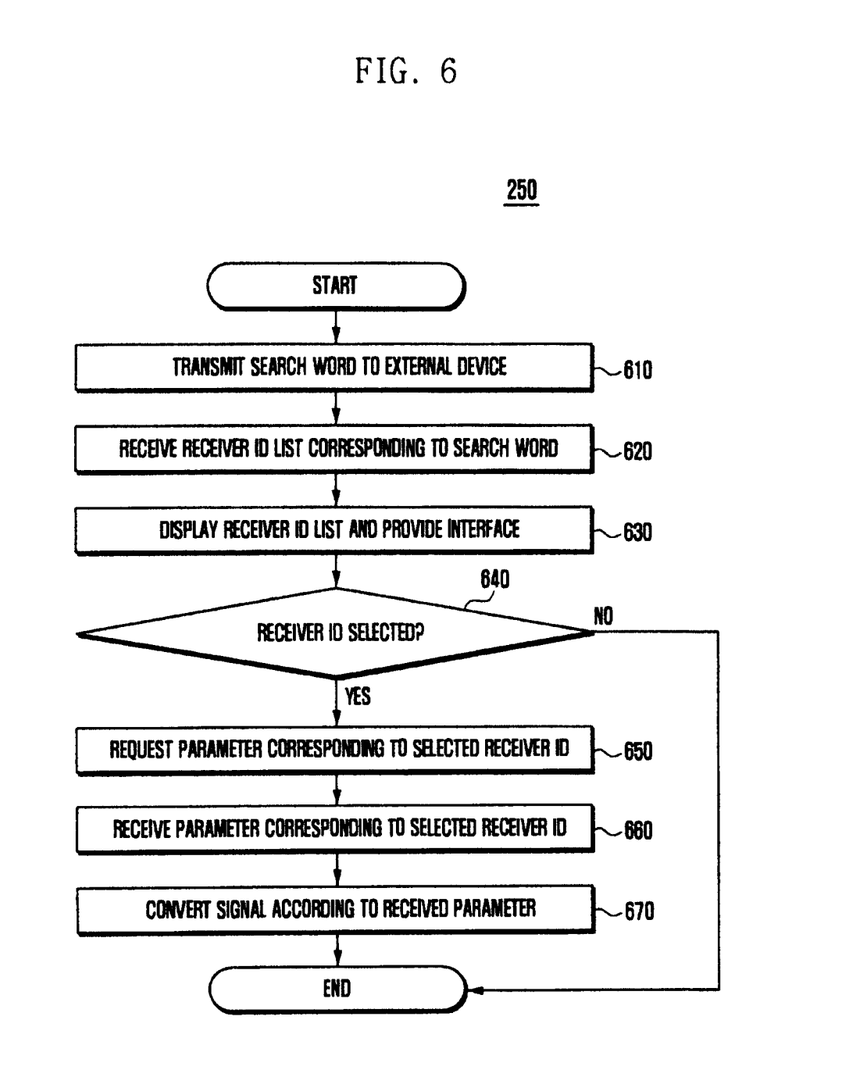
FIG. 6 is a flowchart illustrating step 250 of FIG. 2 in more detail.

FIG. 6 is a flowchart illustrating step 250 of FIG. 2 in more detail.

Referring to FIG. 6, the controller 160 transmits a search word to an external device through an RF communication unit 110 in step 610. For example, the external device may be an external service accessed through a network, such as the Internet, and held or operated by a communication business, a terminal manufacturer, and application distributor. When receiving the search word, the external device may search a receiver ID list corresponding to the search word from an internal database of the external device or a database established in a separate service, and may transfer the receiver ID list to the apparatus 100 for controlling a sound signal output. The RF communication unit 110 receives the receiver ID list corresponding to the search word from the external device in step 620. When a receiver ID is not included in the receiver ID list corresponding to the search word, the apparatus 100 for controlling a sound signal output may output an error message.

When at least one receiver ID is included in the receiver ID list corresponding to the search word, the controller 160 controls the display unit 132 to display a corresponding receiver ID list to the user and provides an interface so that the user may select one receiver ID from items of a corresponding list in step 630. The interface of step 630 may be a form similar to the interface illustrated in the pictures of FIGS. 3 to 5.

The controller 160 determines whether a receiver ID is input from the user in step 640. The user may select one receiver ID from the list displayed in step 630. However, when a suitable receiver ID is included in the list displayed in step 630, the receiver ID may not be selected from the list. When the receiver ID is not selected by the user in step 640, the process skips steps 650-670 and is terminated, and a sound signal may be converted according to a default parameter. When the receiver ID is selected by the user and detected in step 640, the process goes to step 650.

The controller 160 controls the RF communication unit 110 in step 650 to transmit a parameter request signal including a corresponding receiver ID to the external device previously communicated with in step 610. After step 650, RF communication unit 110 receives a sound signal control parameter corresponding to the receiver ID from the external device in step 660. The controller 160 controls the audio processor 120 to convert a digital sound signal into an analog sound signal according to the received sound signal control parameter in step 670.

According to the exemplary embodiment of FIG. 6, a suitable parameter with respect to a receiver ID, which may not be stored in the apparatus 100 for controlling a sound signal output, is acquired using the external device, and a sound signal may be converted based on the acquired parameter.

Figure 7:
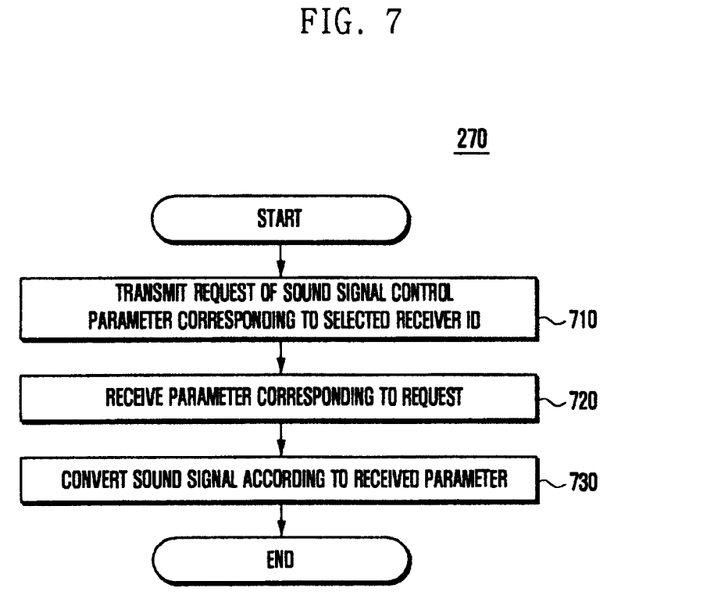
FIG. 7 is a flowchart illustrating a modified example of step 270 shown in FIG. 2 in more detail.

FIG. 7 is a flowchart illustrating a modified example of step 270 shown in FIG. 2 in more detail.

If sound signal control parameters with respect to all receiver IDs are stored in the apparatus 100 for controlling a sound signal output, the procedure of FIG. 7 may be omitted. However, when sound signal control parameters with respect to all or some of the receiver IDs are not stored in the apparatus 100 for controlling a sound signal output, the procedure of FIG. 7 may be used.

The RF communication unit 110 transmits a request of a sound signal control parameter corresponding to the receiver ID selected at step 240 in step 710. The RF communication unit 110 receives a sound signal control parameter corresponding to the request from the external device in step 720. The controller 160 controls the audio processor 120 to convert a sound signal by applying the received parameter in step 730, and the process of FIG. 7 then terminates.

In the procedure of FIG. 7, a sound signal control parameter with respect to the receiver ID is used to convert the sound signal. If some of the sound signal control parameters with respect to the receiver ID are stored in the memory 150, the controller 160 may determine whether a sound signal control parameter with respect to the selected receiver ID is stored in the memory 150. When the sound signal control parameter with respect to the selected receiver ID is stored in the memory 150, the procedure of FIG. 7 is omitted and the sound signal control parameter stored in the memory 150 may be used. When the sound signal control parameter with respect to the receiver ID is not stored in the memory 150, the procedure of FIG. 7 may be executed. In addition, the controller 160 may store the received sound signal control parameter in the memory 150 associated with a corresponding receiver ID.

Figure 8:
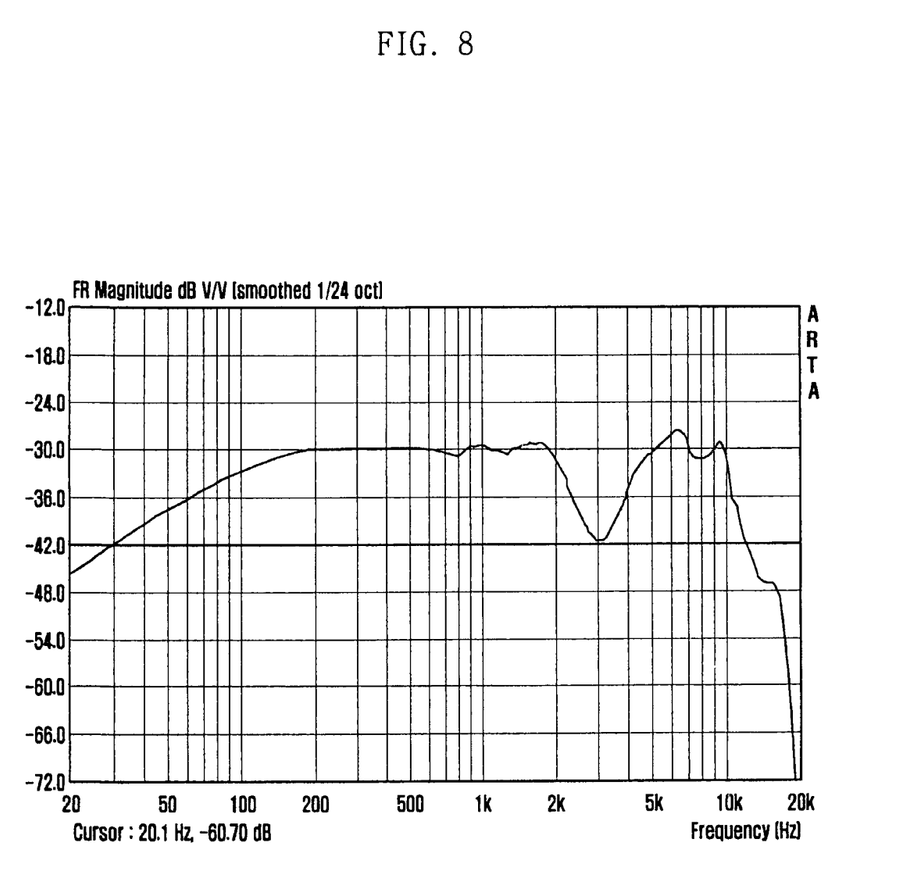
FIG. 8 and FIG. 9 are graphs illustrating frequency responses of receivers.
Figure 9:
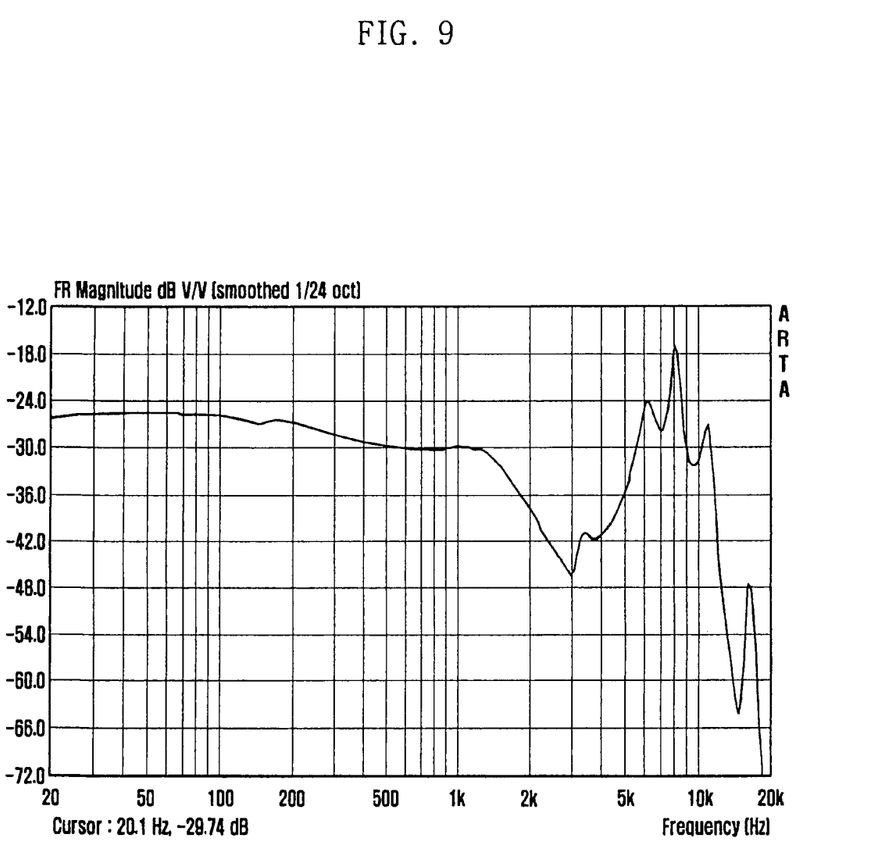

FIGS. 8 and 9 are graphs illustrating frequency responses of example receivers.

Upon comparison of a graph of FIG. 8 for a first receiver with a first receiver ID with a graph of FIG. 9 for a second receiver with a second receiver ID, the first receiver of FIG. 8 outputs a relatively weak signal in the band of 20 Hz to 200 Hz, and outputs an excellent signal in the band of 1 kHz to 5 kHz in comparison with the second receiver of FIG. 9. A signal output becomes weak in the band of 10 kHz to 20 kHz. Meanwhile, the second receiver of FIG. 9 outputs a relatively stable signal in the band of 20 Hz to 200 Hz, and outputs a weak signal in the band of 1 kHz to 5 kHz in comparison with the first receiver of FIG. 8. Further, great variation occurs in the band of 10 kHz to 20 kHz.

Such receiver information indicating optimal signal performance of a particular receiver, as well as less optimal signal performance, such as shown in FIGS. 8-9 and described above, may be displayed as sound signal control parameters in the pictures or screens shown in FIGS. 3-5, allowing a user to select receivers based on desired and optimal performance of a given receiver.

According to the exemplary embodiment of the present invention, corresponding sound signal control parameters are previously stored in the receivers of FIG. 8 or FIG. 9 or are acquired from the external device. After that, the sound signal may be output in a suitable form according to selection of the user by applying the sound signal control parameters upon conversion of the sound signal.

Since computer program instructions may be mounted, loaded, or stored in a processor of a universal computer, a special computer or other programmable data processing equipment, instructions performed through a processor of a computer or other programmable data processing equipment generates components for performing functions described in one or more of the blocks or steps of the flowcharts. Since the computer program instructions may be stored in a computer available for or computer readable memory capable of orienting or configuring a computer or other programmable data processing equipment to implement functions in a specific method, available instructions stored in the computer or a computer readable memory may produce manufacturing articles involving an instruction device executing functions described in the one or more blocks or steps of the flowcharts. Because the computer program instructions may be mounted, loaded, or stored on a computer or other programmable data processing equipment, a series of operation steps are performed in the computer or other programmable data processing equipment to create a process executed by the computer such that instructions performing the computer or other programmable data processing equipment may provide steps for executing functions described in the one or more blocks or steps of the flowcharts.

Further, each block may indicate a part of a module, a segment, or a code including at least one executable instruction for executing one or more specific logical functions. It should be noted that several execution examples may generate functions described in blocks or steps out of an order. For example, two continuously shown blocks or steps may be simultaneously performed, and the blocks or steps may be performed in an inverse order according to corresponding functions.

As used in the description herein of the exemplary embodiment of the present invention, the term "unit" refers to software or a hardware structural element such as FPGA or ASIC, and the "unit" perform specific roles. However, the "unit" is not limited to software or hardware. The "unit" can be configured to be stored in an addressable storage medium and to play or operate at least one processor. Accordingly, for example, the "unit" includes software structural elements, object-oriented software structural elements, class structural elements, task structural elements, processes, functions, attributes, procedures, subroutines, segments of a program code, drivers, firmware, microcode, circuit, data, database, data structures, tables, arrays, and variables. Functions provided in structural elements and "units" may be engaged by the smaller number of structural elements and "units", or may be divided by additional structural elements and "units". Furthermore, structural elements and "units" may be implemented to play or operate a device or at least one CPU in a security multimedia card.

According to the exemplary embodiment of the present invention, the user can receive an optimal sound by providing a suitable sound signal according to the receiver.

The above-described apparatus and methods according to the present invention can be implemented in hardware or firmware, or as software or computer code, or combinations thereof. Various components such as a controller, a central processing unit (CPU), a processor, and any unit or device described herein includes at least hardware and/or other physical structures and elements. In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of controlling a sound signal output in a terminal, the method comprising:
   displaying a receiver selection interface including a list of receiver identifications representing receivers connectable to the terminal while a receiver is connected to the terminal based at least in part on a determination that a specified application is executed;
   receiving a selection for a receiver identification from the list through the receiver selection interface;
   converting a digital sound signal into an analog sound signal by applying a sound signal control parameter corresponding to the selected receiver identification; and
   outputting the converted analog sound signal to the receiver.

2. The method of claim 1, wherein the terminal stores the receiver identifications and manufacturer names corresponding to the receiver identifications; and
the method further comprises:
   displaying a manufacturer selection interface including a list of the manufacturer names; and
   receiving a selection of a manufacturer name from the list of the manufacturer names through the manufacturer selection interface,
   wherein the receiver selection interface is generated in response to receiving the selection of the manufacturer name, and wherein the receiver identifications in the list correspond to the selected manufacturer name.

3. The method of claim 1, wherein the terminal stores the receiver identifications, manufacturer names corresponding to the receiver identifications, and receiver types corresponding to the receiver identifications; and wherein the method comprises:
   displaying a manufacturer selection interface including a list of manufacturer names;
   receiving a selection of a manufacturer name through the manufacturer selection interface;
   displaying a type selection interface for receiving a selection of a type of the receiver; and
   receiving the selection of the type of the receiver through the type selection interface,
   wherein the list of receiver identifications of the receiver selection interface is displayed corresponding to the selected manufacturer name and the selected type of receiver.

4. The method of claim 1, further comprising:
   determining whether the sound signal control parameter corresponding to the selected receiver identification is stored in the terminal; and
   acquiring the sound signal control parameter corresponding to the selected receiver identification from an external device through a network when the sound signal control parameter corresponding to the selected receiver identification is not stored in the terminal.

5. The method of claim 1, further comprising:
   receiving a search word;
   transmitting the received search word to an external device;
   receiving the receiver identification list corresponding to the search word from the external device;
   transmitting, if an input for selecting the receiver identification from the received receiver identification list is detected, the receiver identification to the external device; and
   acquiring the sound signal control parameter corresponding the transmitted receiver identification from the external device.

6. The method of claim 1, wherein the list of receiver identifications includes at least one earphone or headphone identification and an associated manufacturer name.

7. The method of claim 1, wherein the list of receiver identifications further includes at least one model number associated with the at least one earphone or headphone identification.

8. The method of claim 1, further comprising detecting an insertion of a connector, jack or plug into a connector of the terminal, and wherein providing the receiver selection interface is performed in response to the detection.

9. An apparatus for controlling a sound signal output, the apparatus comprising:
   a touch display screen;
   an audio processor; and
   a controller configured to:
      display, via the touch display screen, a receiver selection interface including a list of receiver identifications representing receivers connectable to the apparatus while a receiver is connected to the apparatus based at least in part on a determination that a specified application is executed,
      receive, via the touch display screen, a selection of a receiver identification through the receiver selection interface,
      convert, via the audio processor, a digital sound signal into an analog sound signal by applying a sound signal control parameter corresponding to the selected receiver identification, and output, via the audio processor, the analog sound signal to the receiver.

10. The apparatus of claim 9, further comprising a memory configured to store receiver identifications and manufacturer names corresponding to the receiver identifications, wherein:
the controller is configured to:
display, via the touch display screen, a manufacturer selection interface including a list of the manufacturer names, and
receive, via the touch display screen, a selection of a manufacturer name in the list of the manufacturer names through the manufacturer selection interface, and
the receiver selection interface is generated in response to receiving the selection of the manufacturer name, wherein the receiver identifications in the list correspond to the selected manufacturer name.

11. The apparatus of claim 9, further comprising a memory configured to store the receiver identifications, manufacturer names corresponding to the receiver identifications, and receiver types corresponding to the receiver identifications, wherein:
the controller is configured to:
display, via the touch display screen, a manufacturer selection interface including a list of the manufacturer names,
receive, via the touch display screen, a selection of one manufacturer name through the manufacturer selection interface,
display, via the touch display screen, a type selection interface for receiving a selection of the type of the receiver, and
receive a selected type of the receiver through the type selection interface, and
the receiver selection interface including the list of receiver identifications is displayed corresponding to the selected manufacturer name and the selected type of receiver.

12. The apparatus of claim 9, further comprising a memory and a communication unit comprising at least one of an RF transmitter and an RF receiver, wherein:
the controller is configured to:
determine whether the sound signal control parameter corresponding to the selected receiver identification is stored in the memory, and acquire, via the communication unit, the sound signal control parameter corresponding to the selected receiver identification from an external device through a network if the sound signal control parameter corresponding to the selected receiver identification is not stored in the memory.

13. The apparatus of claim 9, further comprising a communication unit comprising at least one of an RF transmitter and an RF receiver, wherein:
the controller is configured to:
receive a search word,
transmit the received search word to an external device,
receive the receiver identification list corresponding to the search word from the external device,
transmit, if an input for selecting the receiver identification from the receiver identification list is detected, the receiver identification to the external device, and
acquire the sound signal control parameter corresponding the transmitted receiver identification from the external device.

14. The apparatus of claim 9, wherein the list of receiver identifications includes at least one earphone or headphone identification and an associated manufacturer name.

15. The apparatus of claim 9, wherein the list of receiver identifications further includes at least one model number associated with the at least one earphone or headphone identification.

16. The apparatus of claim 9, wherein the controller is configured to:
detect an insertion of a connector, jack or plug into a connector of the apparatus, and
display, via the touch display screen, the receiver selection interface in response to the detection.

17. The apparatus of claim 9, wherein the apparatus is a mobile device.

18. A non-transitory computer-readable storage medium having stored therein program instructions, which when executed by a processor of an electronic device, causes the electronic device to perform the method of claim 1.

19. An apparatus comprising:
a touch screen; and
a memory to store first receiver information and second receiver information, the first receiver information corresponding to a first receiver external to the apparatus and operatively connectable to the apparatus, and the second receiver information corresponding to a second receiver external to the apparatus and operatively connectable to the apparatus; and
a processor adapted to:
display, via the touch screen, receiver identifications including first receiver identification corresponding to the first receiver information, and second receiver identification corresponding to the second receiver information while a receiver is connected to the apparatus based at least in part on a determination that a specified application is executed;
select one of the first receiver identification and the second receiver identification in response to an user input;
convert a digital sound signal into an analog sound signal using a setting corresponding to the selected receiver identification; and
output the analog sound signal via the receiver operatively connected to the apparatus.

20. The apparatus of claim 19, wherein the processor is adapted to:
adjust an intensity of the analog sound signal.

21. The apparatus of claim 19, wherein the processor is adapted to:
perform adjusting with respect to a specified frequency band of the analog sound signal.

22. The apparatus of claim 19, further comprising a connector, wherein the processor is adapted to:
perform the displaying based at least in part on a determination that a connection is established between the apparatus and the receiver via the connector.

23. The apparatus of claim 19, further comprising a wireless communication module, wherein the processor is adapted to:
receive, via the wireless communication module, at least a portion of the first receiver information, the second receiver information, or the setting from an electronic device external to the apparatus.

* * * * *